Jan. 8, 1952 — F. J. EDWARDS — 2,581,843
PICTURE FRAME
Filed March 1, 1949
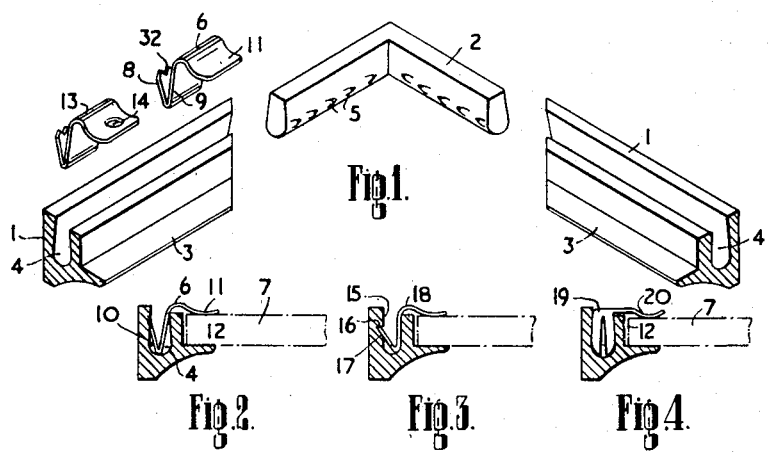
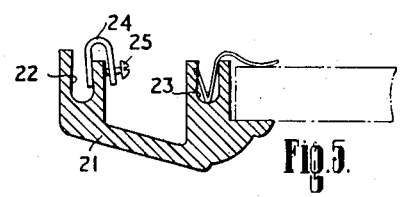
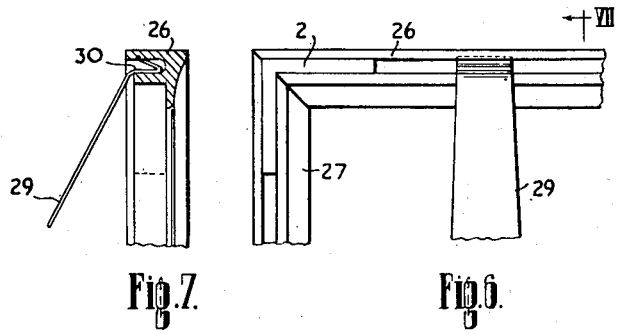
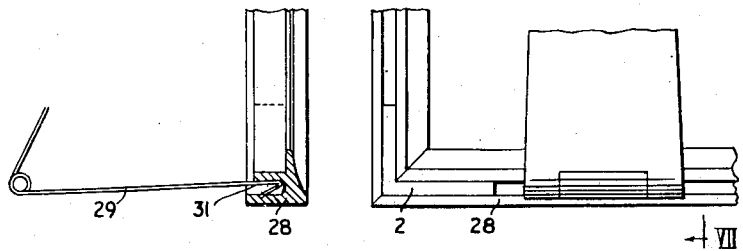
INVENTOR.
FREDERICK JAMES EDWARDS
BY
ATTORNEY Patented Jan. 8, 1952

2,581,843

UNITED STATES PATENT OFFICE 2,581,843

PICTURE FRAME

Frederick James Edwards, West Kirby, England

Application March 1, 1949, Serial No. 79,032
In Great Britain May 11, 1948

1 Claim. (Cl. 40—155)

The present invention relates to frames for pictures, photographs, mirrors, notices and the like which will hereinafter be referred to as pictures and the like.

It is an object of the present invention to provide a frame for pictures and the like which may be conveniently mass-produced.

According to the present invention a frame for pictures and the like comprises in combination a plurality of border elements having a longitudinal groove therein, the groove of at least one of the frame elements being continuous throughout the length of the elements, and junction pieces to engage in the grooves of adjacent border elements to connect said elements together. Preferably the grooves in all of the frame elements are continuous throughout the length of the element.

The frame may include clips adapted to engage in the said grooves for holding a picture or the like in position in the frame.

The said grooves may be parallel sided but are preferably undercut, that is to say, they are preferably of divergent cross-sectional shape away from the face in which they are formed and/or are formed with an outwardly directed longitudinal ledge, notch or step in one or both walls thereof or are otherwise formed so as to be of greater transverse width at some section spaced from the face thereof than the transverse width at the face.

The junction pieces may be provided with serrations or projections directed away from the ends thereof so as to resist endwise withdrawal of the junction pieces from the grooves of the frame elements. As a rule the junction pieces will be formed as rectangular corner pieces for use with mitred frame elements in making frames of rectangular shape but obviously the invention may be employed for making frames of other shapes, such as for example, as circular frames using curved frame elements in which event appropriately curved junction pieces may be employed.

The invention includes the provision of clips adapted for engagement in the grooves for the purpose of holding a picture or the like in position in a frame. Such clips or certain of them may be apertured or provided with a hook to enable them to be used for suspending a frame.

The invention is further described by way of example with reference to the accompanying drawings, in which:

Fig. 1 is a fragmentary perspective view showing frame elements, a junction piece and clips according to the invention, separate from one another;

Fig. 2 is a fragmentary sectional view showing a frame element and clip of Fig. 1 assembled;

Fig. 3 is a view similar to Fig. 2 showing a modified form of frame element;

Fig. 4 is a view similar to Fig. 2 showing a modified form of clip;

Fig. 5 is a sectional view of a relatively wide frame element;

Fig. 6 is a fragmentary rear elevation of a picture frame provided with a stand; and, Fig. 7 is a side sectional elevation taken on the line VII—VII of Fig. 6.

Fig. 1 shows a pair of mitred frame elements 1, which are adapted to be interconnected by a junction piece 2. The frame elements are provided with the usual rebate 3 in which to receive the article or articles to be framed and have a body portion and strips extending rearwardly therefrom, to form in the rear face of the frame elements, a longitudinal groove 4. It will be observed that each of the grooves 4 is of greater width at sections spaced from the rear face of its frame element than at the face of the frame element, i. e. it is undercut. The junction piece 2 is of cross-sectional shape corresponding to the cross-sectional shape of the grooves 4 so that by virtue of its engagement in the ends of the grooves 4 of adjacent frame elements it will serve to hold the frame elements together. The junction piece 2 is provided with serrations or projections 5 directed away from the ends thereof adapted to resist endwise withdrawal of the junction piece from the grooves. The junction pieces can be withdrawn sidewise by spreading the strips thereby widening the groove.

Fig. 1 shows a clip 6 suitable for insertion in the groove 4 as illustrated in Fig. 2 for the purpose of holding a picture or the like, indicated in Fig. 2 by the reference numeral 7, in position in the frame.

The clip 6 is formed as a V-shaped element, one arm 8 of which is shorter than the other arm 9, the end of the shorter arm 8 being adapted to engage against a wall 10 (Fig. 2) of the groove 4 so as to resist withdrawal of the clip from the groove. The longer arm has an approximately right-angled extension or lug 11 adapted to overlie the edge 12 of the frame element and to engage the margin of a picture or the like 7 to hold the picture in the frame. Any suitable number of such clips 6 may be pressed into the grooves 4 of a frame to hold the picture or the like in position and so as to avoid the customary necessity of using tacks for this purpose.

Fig. 1 also illustrates a clip 13 which is similar to the clip 6 except that it is provided with an aperture 14 in the extension 11 to enable the clip to be used for suspending the frame. Alternatively the extension 11 may be provided with a suitably hooked end.

Fig. 3 illustrates an alternative form of frame element having a parallel sided groove 15 with an outwardly directed longitudinal ledge, notch or step 16 formed in the outer side wall thereof adapted for engagement with the end of the shorter arm 17 of a clip 18 very similar in construction to the clip 6. If desired of course the step 16 may be formed in both walls of the groove 15 to enable clips such as 18 to be employed or clips with an oppositely directed shorter arm as compared with that of clip 18. Moreover a divergent groove such as the groove 4 may also have a ledge, notch or step such as 16 formed in one or both walls thereof.

Fig. 4 illustrates an alternative form of clip 19 of bifurcated form having an approximately right-angled extension 20 extending from the non-bifurcated end thereof and adapted to overlie the inner edge 12 of the frame to hold a picture or the like 7 in position.

In the case of relatively large or wide or heavy frames, such as illustrated at 21 in Fig. 5, it may be advisable to provide two parallel grooves in each frame element as illustrated at 22, 23 in Fig. 5 so as to enable two junction pieces to be employed at each corner of the frame. Fig. 5 also illustrates an alternative form of clip 24 of U-shape and provided with a grub screw 25 for firmly securing it to the frame. Such a clip 24 is particularly useful for the purpose of suspending a relatively heavy frame.

Fig. 6 illustrates three frame elements 26, 27, 28 secured together by junction pieces 2 and provided with a stand 29 which at its ends is formed with clips 30, 31 similar in construction to the clip 6 so that by engagement of the clips 30, 31 in the grooves of opposite frame elements 26, 28, the stand can be fixed to the frame to enable the frame to stand in an approximately vertical position on a table or the like.

The clips may be formed of spring steel, bronze, plastic material or of any other suitable material and clips such as the clip 6 are preferably provided with serrations 32 at the end of the shorter arm thereof to enable them more adequately to grip the wall of a groove in a frame element. The clip 19 is especially suitable for production out of plastic material.

The frame elements and corner pieces may be formed of metal, wood, plastic material or of any other suitable material. The invention is especially useful for the mass production of frame elements of plastic material by extrusion and it is believed that the mass production of picture frame elements of the present invention by extrusion of plastic material can be carried out very inexpensively.

By means of the present invention, frame elements and junction pieces may be mass produced and sold as sets which can be easily assembled by relatively inexperienced people and the invention thus includes sets of parts for making picture frames consisting of frame or border elements and junction pieces as described. The invention furthermore includes sets of parts as indicated above including clips as described and also sets of such parts including a leg, stand or other support provided with clips enabling it readily to be secured to the frame by insertion of such clips in the grooves of the frame elements.

I claim:

A picture frame comprising a plurality of border elements having a body portion, spaced resilient strips carried by said body portion and projecting rearwardly an equal distance therefrom, the walls between said strips being gradually convergent so as to provide a deep, undercut, longitudinal groove therebetween for the receipt of clips for retaining the picture in the frame, a rebate projecting laterally from said body portion, the rearmost face of said rebate being spaced from the rearmost face of said border element carried strips to present a surface against which the picture is held by the clips, the wall of said body portion adjacent said rebate presenting a picture retaining shoulder and junction pieces engaged in the ends of the grooves of adjacent border elements to connect said elements together, said junction pieces comprising right angle members of cross-sectional shape corresponding to the cross-sectional shape of the grooves between said border element carried strips provided with serrations to resist withdrawal of the junction pieces from the grooves.

FREDERICK JAMES EDWARDS.

REFERENCES CITED

The following references are of record in the file of this patent:

UNITED STATES PATENTS

| Number | Name | Date |
| --- | --- | --- |
| 842,645 | Gallagher | Jan. 29, 1907 |
| 918,233 | Weber | Apr. 13, 1909 |
| 2,075,588 | Meyers | Mar. 30, 1937 |
| 2,081,722 | Weinzierl | May 25, 1937 |

FOREIGN PATENTS

| Number | Country | Date |
| --- | --- | --- |
| 159,739 | Great Britain | Mar. 10, 1921 |
| 373,230 | Germany | Apr. 9, 1923 |
| 363,880 | Great Britain | Dec. 31, 1931 |